(12) United States Patent
Madden et al.

(10) Patent No.: US 6,219,479 B1
(45) Date of Patent: Apr. 17, 2001

(54) OPTICAL STAR ASSEMBLY

(75) Inventors: William T. Madden, Solon; Anthony Joseph Corso, Struthers; Edward M. Bungo, Cortland, all of OH (US); Paul Gerhard Halbach, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/186,322

(22) Filed: Nov. 4, 1998

Related U.S. Application Data
(60) Provisional application No. 60/066,127, filed on Nov. 12, 1997.

(51) Int. Cl.⁷ .................................................... G02B 6/36
(52) U.S. Cl. ................................ 385/46; 385/59; 385/65; 385/71; 385/83
(58) Field of Search ............................... 385/15, 24, 31, 385/32, 39, 46, 53, 54, 55, 56, 58, 59, 60, 65, 66, 68, 70, 72

(56) References Cited

U.S. PATENT DOCUMENTS

| | | | |
|---|---|---|---|
| 4,995,692 | * 2/1991 | Dihiello et al. | 385/46 |
| 5,097,522 | 3/1992 | Tackett et al. | 350/96.1 |
| 5,367,595 | 11/1994 | Jennings et al. | 385/71 |
| 5,402,512 | 3/1995 | Jennings et al. | 385/46 |

* cited by examiner

Primary Examiner—Hemang Sanghavi
(74) Attorney, Agent, or Firm—Richard A. Jones (57) ABSTRACT

An optical star assembly having a ribbon fiber optic mixing element with the first and second ends. A first and second bundle of fiber optic cables are provided each with an engagement end for connection with a respective end of the ribbon fiber optic mixing element. The ribbon fiber optic mixing element and a portion of the fiber optic cables are carried in the housing so that the housing biases each end of the ribbon fiber optic mixing element towards an engagement end of the first and second bundles of fiber optic cables respectively. The fiber optic cables may be connected to a plurality of optical receivers so that the ribbon fiber optic mixing element distributes optical information from each of the fibers to all of the optical receivers in the assembly.

8 Claims, 7 Drawing Sheets

OPTICAL STAR ASSEMBLY

The benefit of a provisional application U.S. Ser. No. 60/066,127, filed Nov. 12, 1997, entitled "Passive Optical Star" is hereby claimed.

TECHNICAL FIELD

This invention relates to fiber optic couplers, and more particularly to a passive fiber optic star assembly.

BACKGROUND OF THE INVENTION

A passive fiber optic star is a device used to distribute the optical information from one fiber optic source to several fiber optic receivers simultaneously, without an external source of power. The heart of the fiber optic star is its mixing element, a device by which the optical signal coming in from any of several input fibers is distributed more or less evenly among the output fibers. Characteristic features of mixing elements include a number of input and output ports, connection method, uniformity, insertion loss and excess loss. Insertion loss of the amount of attenuation experience between an input and output port. Excess loss of the amount of attenuation of the input signal before reaching the output ports. Such a system as described in U.S. Pat. No. 5,367,595 issued to Jennings et al on Nov. 22, 1994.

U.S. Pat. No. 5,402,512 issued to Jennings et al on Mar. 28, 1995 describes a seven fiber optic line star connection with a retainer that forms a mixing element into a predefined shape. The retainer constraints the mixing element on all sides. The mixing element in one embodiment is made from polymethylmethaacyalate, a material which shrinks approximate two percent when heated and cooled repeatedly. Because the mixing element is constrained on all sides, shrinkage occurs at the ends of the mixing element causing a gap to appear between the linear arrayed fibers and the mixing element. This gap greatly increases the optical insertion loss of the star.

This fiber optic coupling system includes an individual spring and terminal for each fiber plug into the star. As each fiber is plugged into the star, it is retained by a plastic lock. Because the space required for the "push, click, tug" locking mechanism of the system, the fibers must be spaced on 5 mm center lines. The incoming fibers are transitioned in each of three dimensions or directions down into a linear array. In order to minimize light loss, the fiber should not be bent on a radius smaller than 25 mm. Because of the large spacing between the fibers, each fiber must be transitioned many mm in each direction in order to lineup in the linear array without substantially reducing light loss. Accordingly, under this type of system configuration, the transition occurs over a length of 50 mm.

Further, under this fiber optical coupling system a complex assembly of parts is utilized to create channels which guide individual fibers into their appropriate positions in the linear array. The channel was created by assembling a convergent piece with a stop. A combination of two parts creates the channel which guides each fiber into position. The channels are not significantly tight however. The fibers when heated, lose some of their column strength, and tend to relax resulting in extra space in the channels. As a result, the ends of the fibers in the array tend to back away from the mixing element creating a gap and increasing the optical loss. Thus, a solution to the drawbacks of this type of system is needed.

SUMMARY OF THE INVENTION

The invention generally includes an optical star assembly having a ribbon fiber optic mixing element with first and second ends. A first and second bundle of fiber optic cables are provided each with an engagement end for connection with a respective end of the ribbon fiber optic mixing element. The ribbon fiber optic mixing element and a portion of the fiber optic cables are carried in the housing so that the housing biases the ribbon fiber optic mixing element towards an engagement end of the first and second bundles of fiber optic cables respectively. The fiber optic cables may be connected to a plurality of optical receivers so that the ribbon fiber optic mixing element distributes optical information from each of the fibers to all of the optical receivers in the assembly.

In one embodiment of the invention, first and second ribbon holders are secured to respective ends of the ribbon fiber optic mixing element and a bridge extends between the ribbon holders. A stop with a sloped surface is provided on one the of the upper or lower housing halves. The stop is positioned so that when the upper and lower halves are connected together, the sloped surface of the stop engages the bridge to bias the ribbon holder ends, and thus the ends of the ribbon fiber optic mixing element, towards the first and second bundles of fiber optic cables respectively.

In another embodiment of the invention, a bundle of fiber optic cables is provided including a first row of cables aligned in a first plane and overlying a second row of cables aligned in a second plane. A star ferrule is provided including a plurality of channels formed therein each for receiving a fiber optic cable and constructed and arranged so that the fiber optic cable is transitioned in the X, Y and Z directions so that two fibers from the first row are transitioned into a linear array and are spaced apart a distance sufficient to receive a third fiber therebetween from the second row. Accordingly, all the fibers in the first and second row are transitioned into a single linear array engaging the engagement end of the ribbon fiber optic mixing element. More particularly, two fibers from one row are transitioned a distance just sufficient to receive another fiber from the other row therebetween and preferably so that the cables are positioned on 2.2 mm center lines.

These and other objects, features and advantages of the present invention will become apparent from the following brief description of the drawings, detailed description, and appended claims and drawings.

DESCRIPTION OF THE PREFERRED EMBODIMENT

Figure 1:
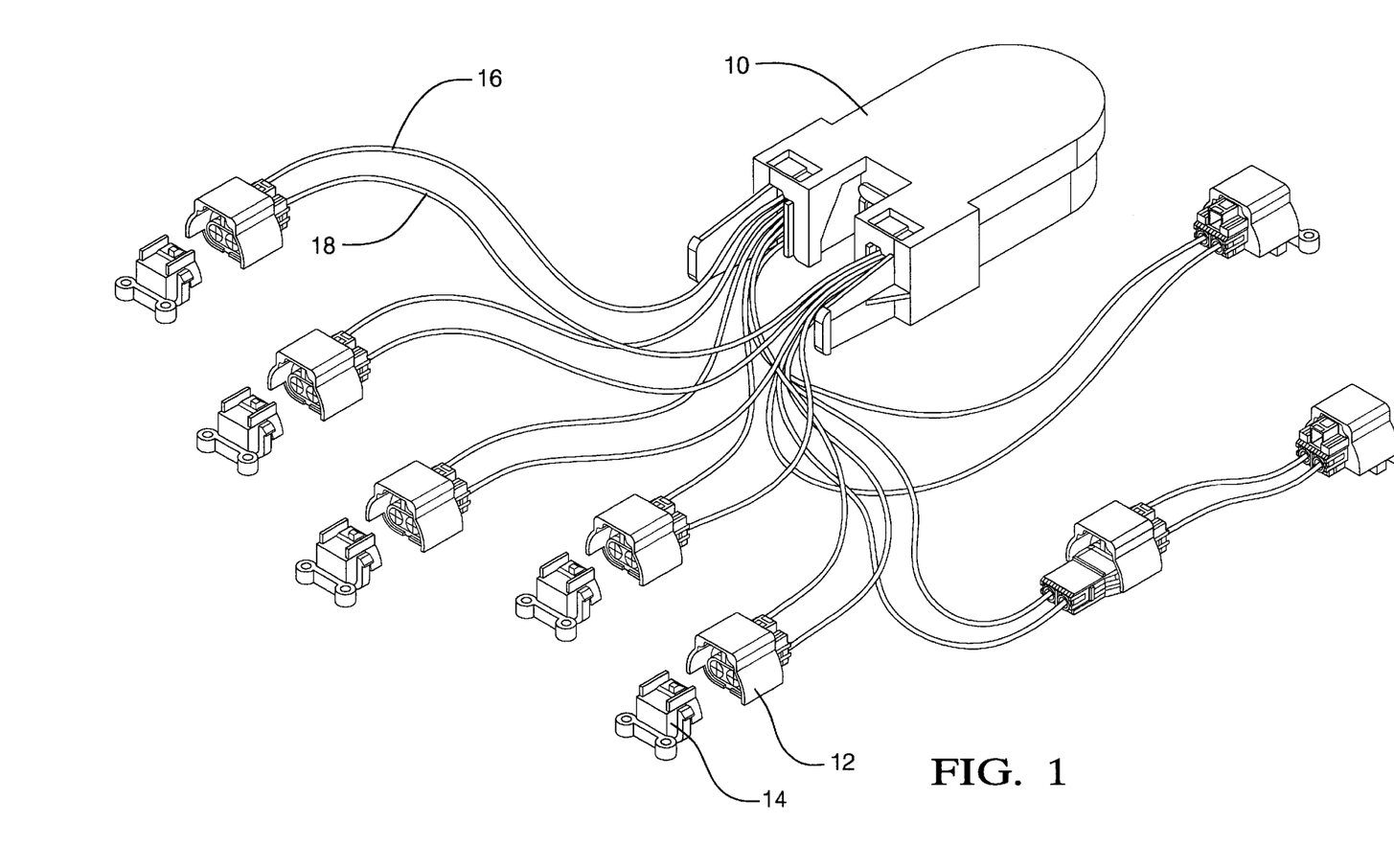
FIG. 1 illustrates a passive optical star assembly including a passive star connected to a plurality of modular connections received in headers according to the present invention.

FIG. 1 illustrates a passive optical star system including a passive star subassembly 10 connected to a plurality of modular connections 12 received in headers 14. Each modular connection 12 includes an input optical fiber line 16 and output optical fiber line 18 connected to the passive star so that each header 14 receive signals from all the other headers.

Figure 2:
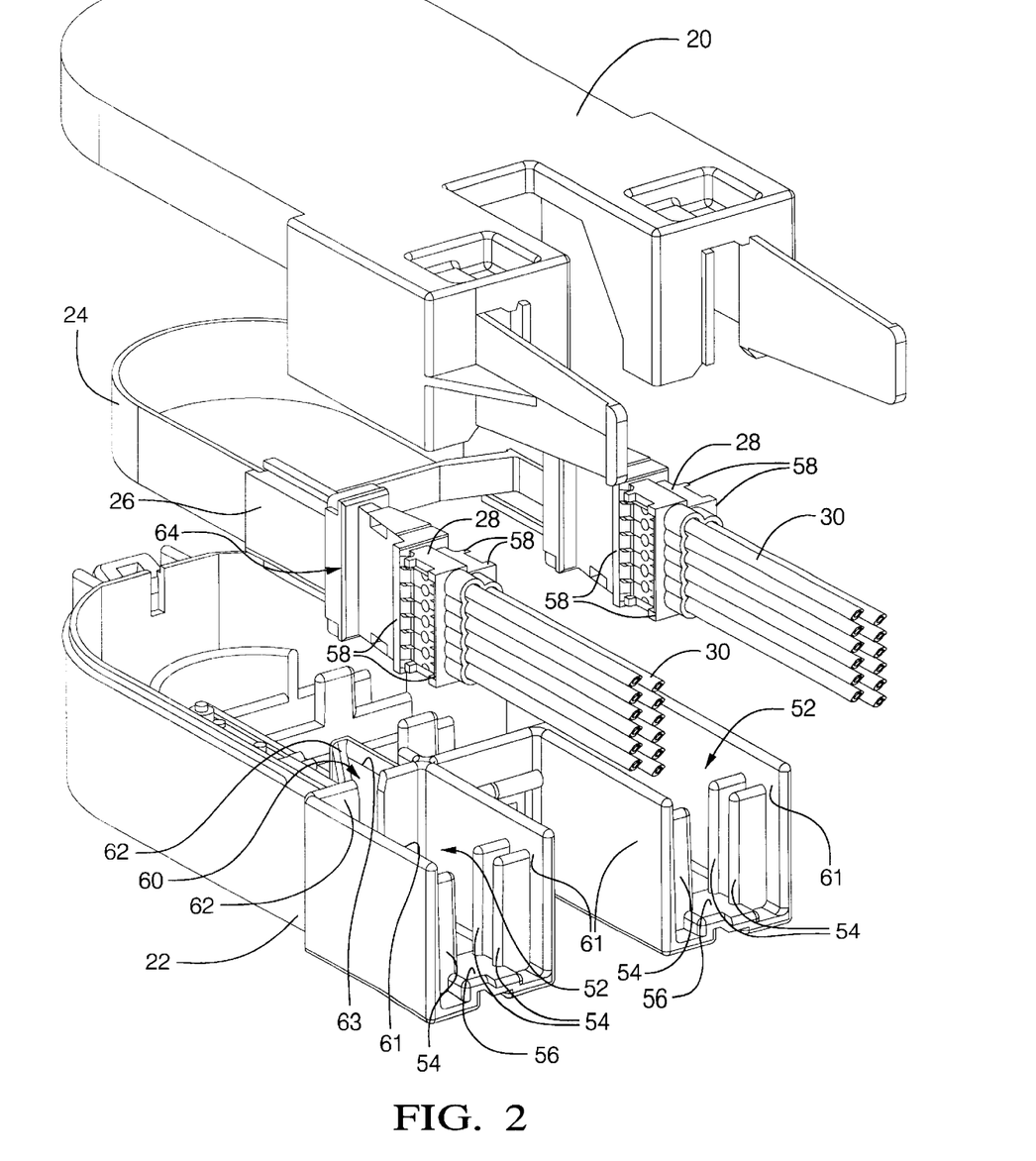
FIG. 2 is an exploded view of the optical star subassembly shown in FIG. 1.

According to the present invention, a passive optical star as shown in FIG. 2 includes a housing lid 20 and a lower housing 22 (i.e., upper and lower half portions) for receiving a flexible ribbon fiber optic mixing element 24. The ribbon mixing element 24 has an element ribbon holder 26 and of V-grooved end face (described in greater detail hereafter) attached at each end of the ribbon mixing element 24. A plurality of fiber optic lines 30 are each received in a star ferrule 28 and positioned for engagement and communication with the ribbon fiber optic mixing element 24. According to the present invention, two star ferrules 28 are used, one for each of the fiber optic cable bundles. One of the fiber optic cable bundles is for input to the ribbon mixing element 24 and one bundle is for output from the ribbon mixing element 24. Preferably, the lower housing 22 includes upwardly extending walls 61 that define a first set of connection bays 52 each for receiving a portion of the star ferrule. Preferably guide rails 54 extend upwardly from the floor 56 of a lower housing 22 inside the construction bay walls 61 and are constructed and arranged to receive wings 58 that extend outwardly from the star ferrule 28. Preferably the lower housing 22 also a second group of upwardly extending walls 63 that define a second set of connection bays 60 each for receiving a portion of a ribbon holder 26 and a front portion of a star ferrule 28 between alignment walls 62 defining the bays 60. Portions (described in greater detail hereafter) of the ribbon holder 26 and the star ferrule 28 together form a guide arm 60 for that is received between the guide walls 62 defining a portion of the second set of connection bays 60.

Figure 3:
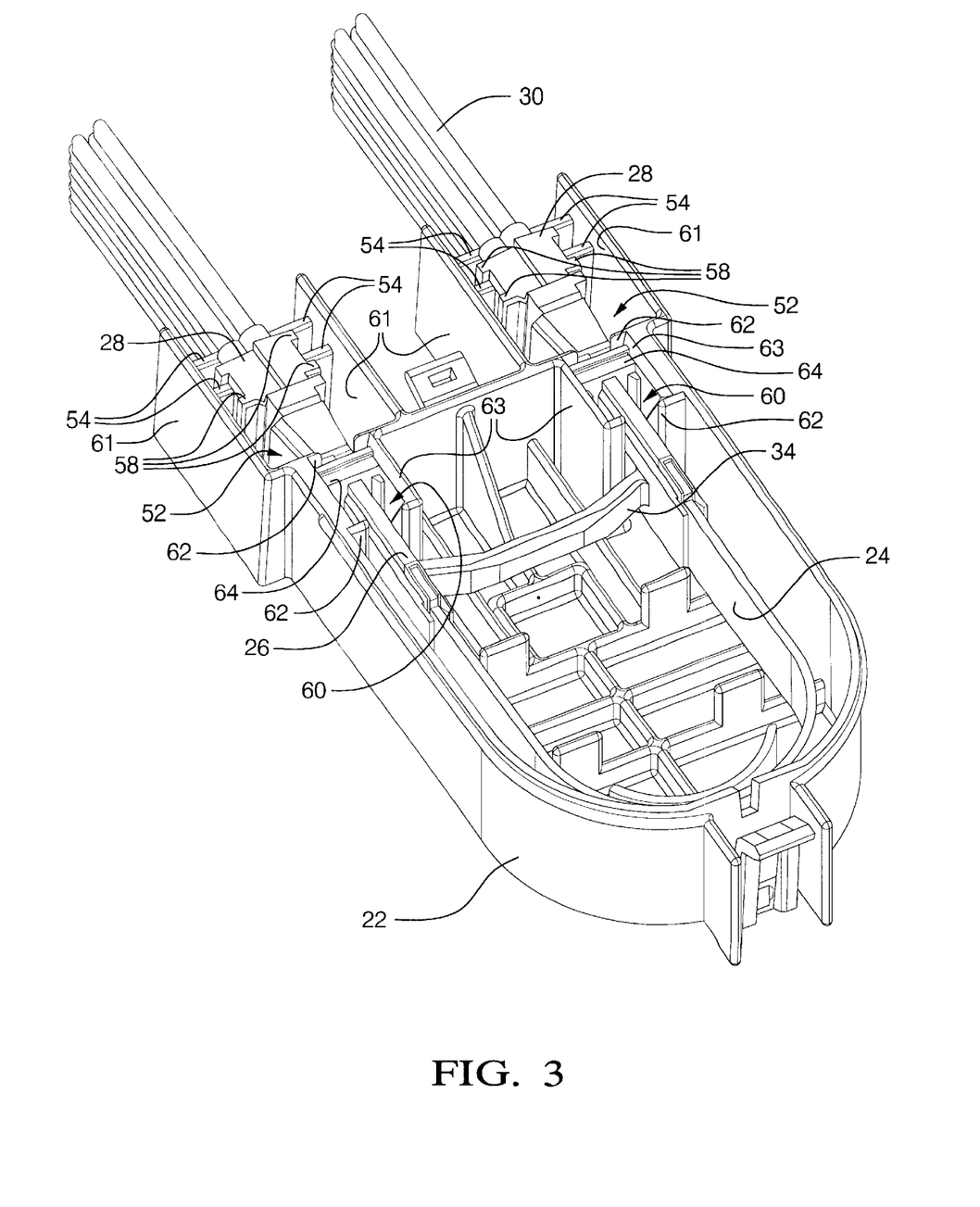
FIG. 3 is a perspective view of a lower housing subassembly of the optical star assembly according to the present invention.

FIG. 3 illustrates a ribbon mixing element 24 received in the lower housing 22. The ribbon mixing element 24 is positioned in the lower housing 22 in a generally U-shaped configuration. A bridge 34 extends between the ribbon holder elements 26. Preferably, the bridge 34 and the ribbon holder elements 26 are a single piece and is made from a material such as polycarbonate or the like that includes a sufficient spring character to bias the ribbon holder elements 26. Thus, the ends of the ribbon fiber optic mixing element 24, are biased against the ends of the fiber optic lines held in the star ferrule 28 so that no signal is lost.

Figure 4:
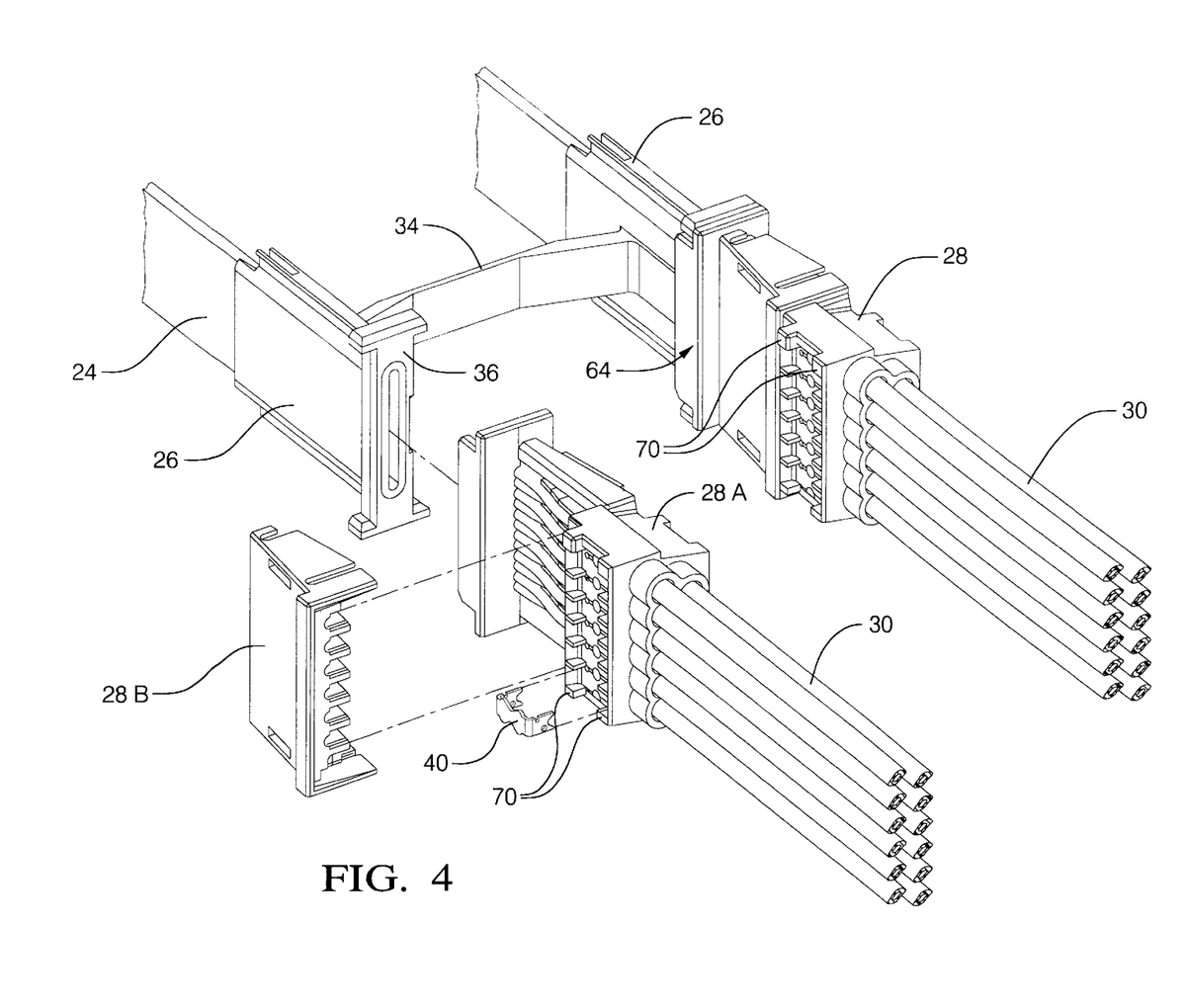
FIG. 4 is a perspective, partially exploded view of the ribbon fiber optic mixing element, ribbon holder, fiber optic bundles and star ferrule combination according to the present invention.
Figure 5:
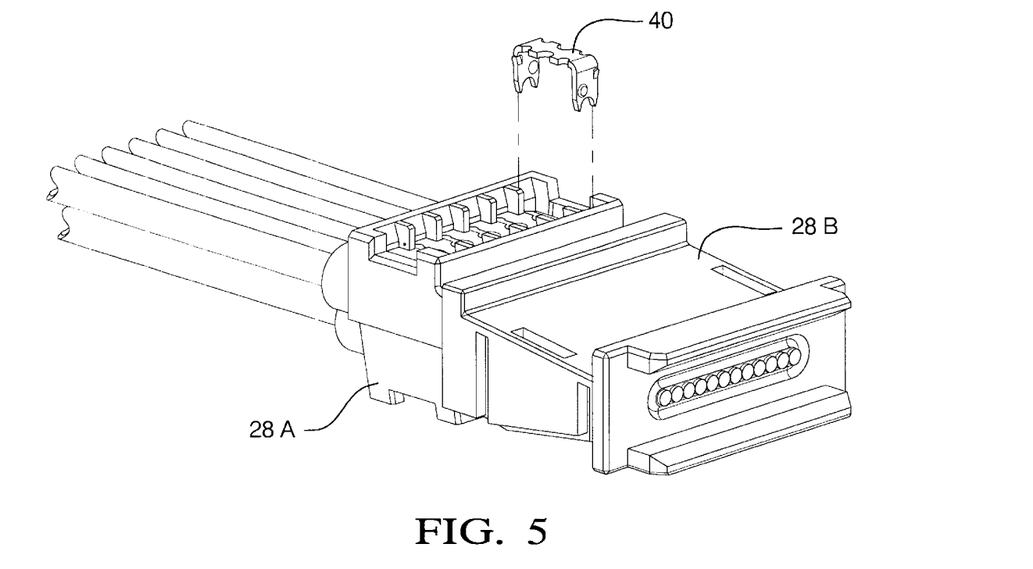
FIG. 5 illustrates a fiber optic bundle and star ferrule combination with a cable retention clip according to the present invention.

FIG. 4 illustrates a star ferrule 28 which includes a first half 28 A and a second half 28 B and may also include an insulation displacement clip 40 for holding the fiber optic cable 30 in position in the star ferrule 28. The insulation displacement clip 40 is held in position by ribs 70 extending from walls of the first half 28 A of the star ferrule, as also shown in FIG. 5.

Figure 6:
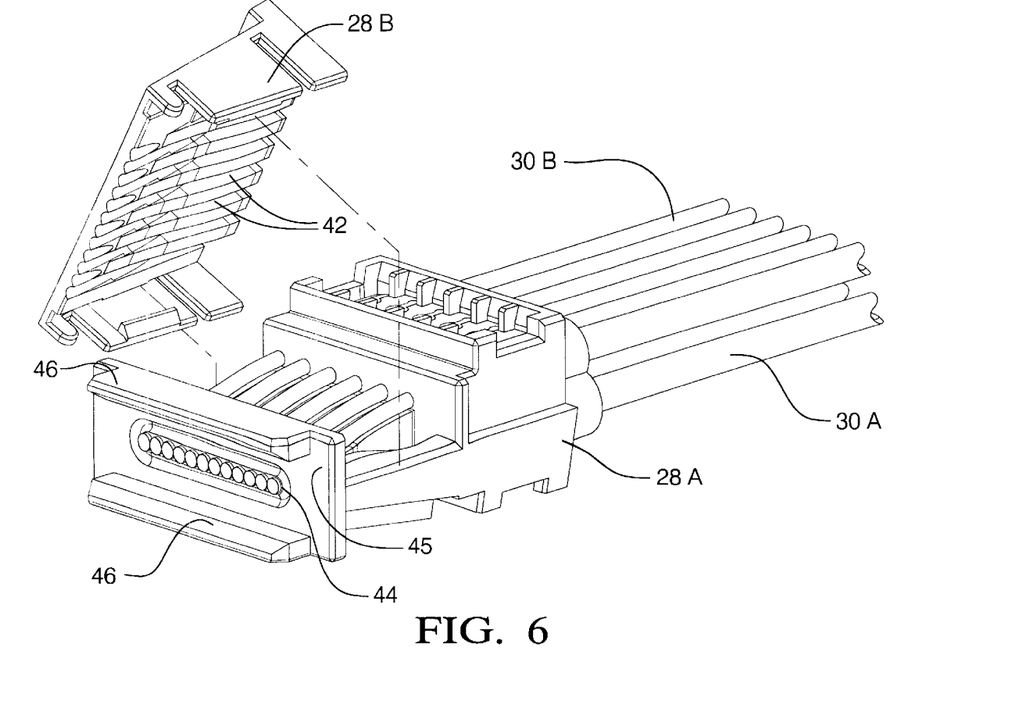
FIG. 6 illustrates a fiber optic bundle and first and second halves of the star ferrule according to the present invention.

As illustrated in FIG. 6, the fiber optic cables are arranged in lower 30 A and upper 30 B groupings, that is, in two overlying planar rows. The upper and lower star ferrule halves 28 A, 28 B have cable channels 42 defined therein that are constructed and arranged to transition each fiber optic cable of the respective groupings 30 A and 30 B into a single linear array for communication with the flat ribbon fiber optic mixing element 24. The channels 42 each are constructed and arranged to transition one of the cables from the plane of the fiber optic bundles 30 A or 30 B in the X, Y and Z direction so that two of the fiber optic cables from one of the groupings are spaced apart a distance sufficient to receive a fiber optic cable from the other groupings. That is, two fibers from the first row are transitioned into a linear array and are spaced apart just enough to receive a third fiber from the second row therebetween. As such, fiber optic cables from the upper and lower planar groupings 30 A and 30 B are transitioned into a single plane and exit the star ferrule 28 through an opening 44 in an end face 45 of the star ferrule.

Figure 7:
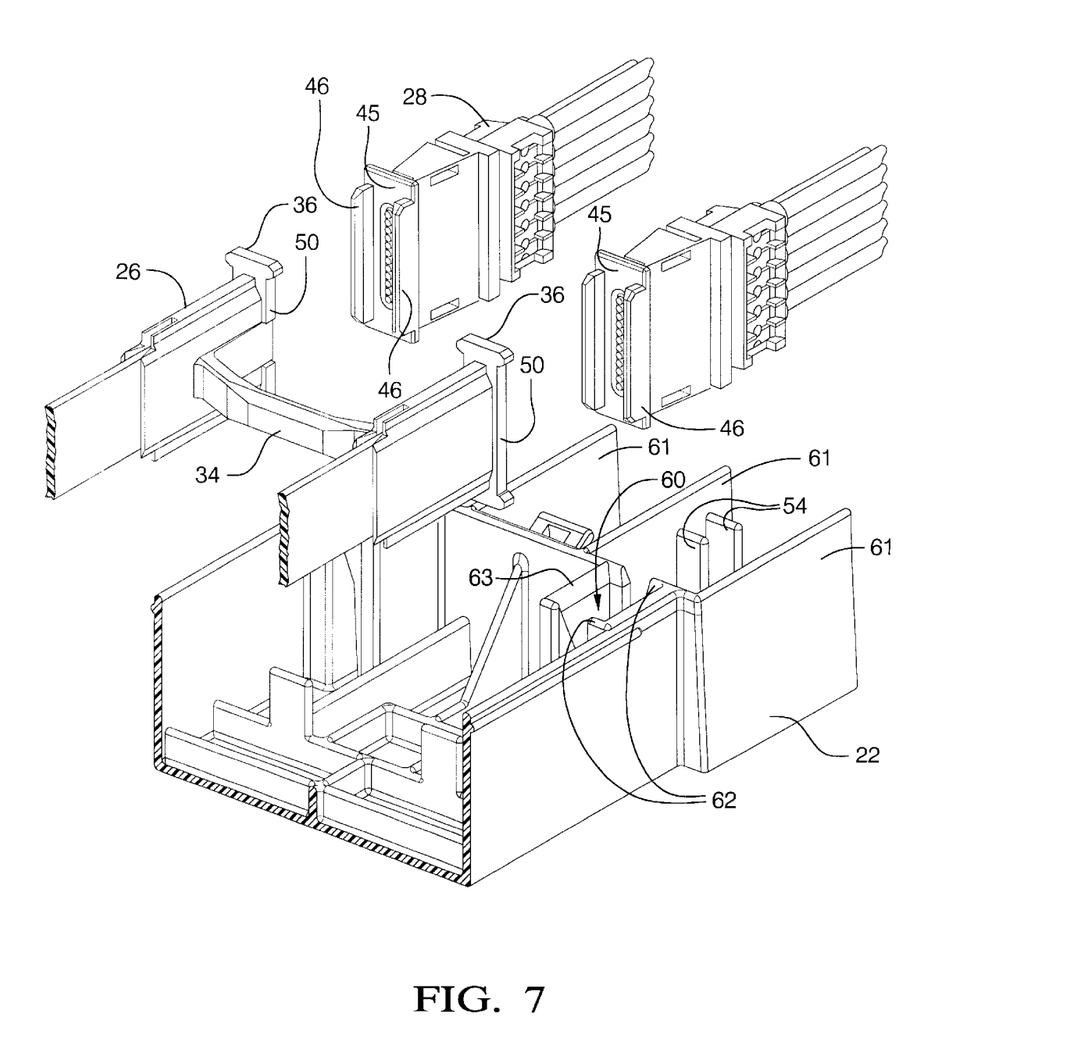
FIG. 7 illustrates the assembly of two fiber optic bundles and the ribbon fiber optic mixing element in the lower housing subassembly according to the present invention.

As shown in FIG. 7, one of the star ferrules 28 A includes alignment projections 46 extending from the end face 45 and are positioned so that each is received in a respective slot 50 defined in the front face of the ribbon holder 26. As indicated earlier, the end face 36 of the ribbon holder 26 with the slots 50 is connected to the end face 45 of the star ferrule 28 so that the projections 46 are received in the slot and together these portions of the ribbon holder 26 and star ferrule 28 defined an outwardly extending alignment arm 64 (see FIGS. of 2, 3, 4, and 9) that is received in a connection bay 60 and held in position by alignment walls 62 of a lower housing 22.

Figure 8:
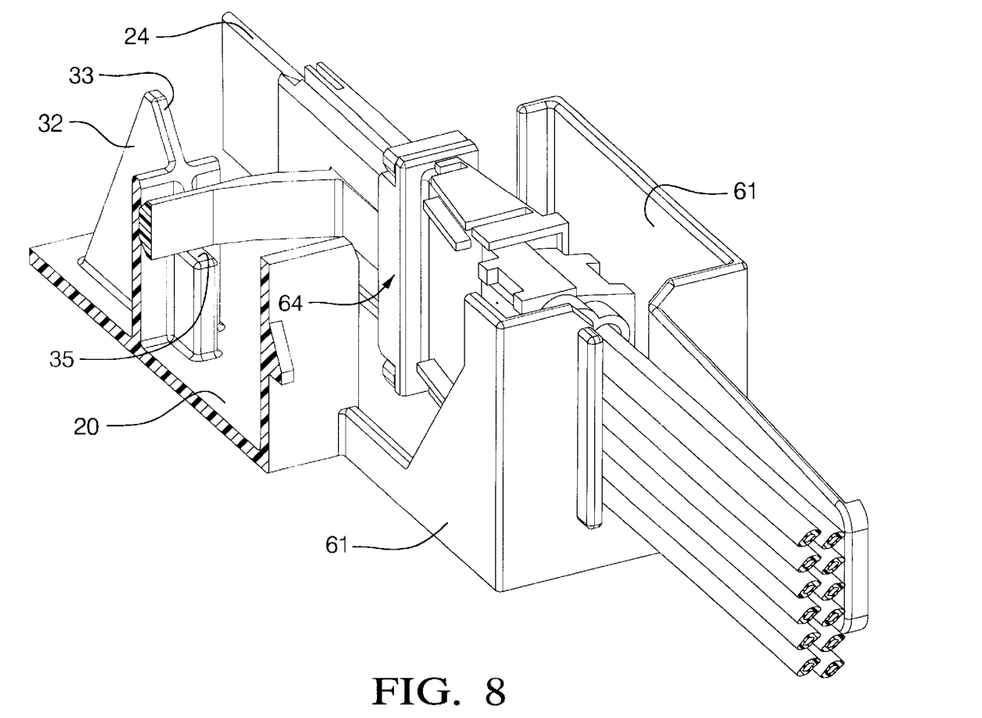
FIG. 8 illustrates the engagement of a stop on the upper housing with the bridge connecting the ribbon holders of the optical star assembly according to the present invention.

FIG. 8 is another view of the present invention showing a stop 32 on the housing cover 20. The stop 32 includes a sloped surface 33 that coverages on a ledge 35. As the cover 20 is connected to the lower housing 22, the bridge 34 (extending between the ribbon holder elements 26) engages the sloped surface 33 and rides along the sloped surface 33 until the bridge lands on the ledge 35. As the bridge 34 rides down the sloped surface 33, the ribbon holder elements 26 and the ends of the ribbon fiber optic mixing element 24 are biased towards ends of the fiber optic cables 30 in each of the star ferrules 28. As such, the stop is responsible for maintaining z-axis control of the ribbon mixing element 24.

Figure 9:
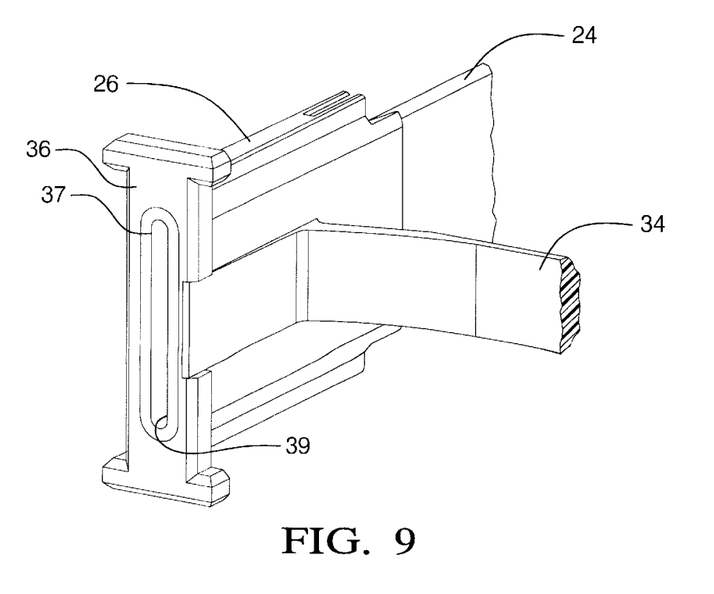
FIG. 9 illustrates a ribbon holder having a V-shaped grooved end face according to the present invention.

FIG. 9 shows the ribbon holder 26 with a ribbon element passage 39 therethrough and a V-groove 37 formed in the end face 36 immediately adjacent the ribbon element passage 39. The ribbon fiber optic mixing element 24 is extended through the passage in the end face and the end of the ribbon element 24 is melted so that the melted material flows into the V-shaped groove in the end face 36. After the material cools, a mechanical connection is formed to hold the ribbon mixing element 24 firmly to the ribbon holder 26. The melting process also provides a smooth uniform surface, at the end of the ribbon, to interface with a fiber optic cables of the star ferrule thereby reducing light loss.

As will be appreciated from the foregoing, the present invention overcomes many of the disadvantages of the prior art in that the present invention stacks fiber optic lines immediately next to one another in the same plane and so that the fibers sit on approximately 2.2 mm center lines. Because the fiber optic lines are tightly grouped into overlying planar rows by the star ferrule, the fibers do not have to be transitioned as far in the X, Y and Z direction in order to form a linear array for communication with the flat ribbon fiber optic mixing element 24. The reduced transition distance means that all the fibers can be stripped to the same length, and no spring is necessary to take up the differences in path length between different fiber optic cables. A 12 way star ferrule assembly according to the present provides distinct channels to guide fibers into their appropriate positions in the linear array with sufficiently fewer and/or smaller pieces than that required by prior art structures. This also reduces the packaging sides of the star ferrule assembly.

According to the present invention a 12 way star ferrule is designed so that fibers will protrude from the end face about 0.5 mm. When mated with the ribbon fiber optic mixing element 24, the fibers 30 are forced back flush with a star ferrule end face surface 45. Instead of individually spring loading each fiber optic cable as in the prior art, the present invention uses a single spring element which in this case is be ribbon retainer to assure flush contact with the fiber optic mixing element 24 and the ends of the cable in the star ferrules 28. When the star housing cover 20 is attached, the stop 32 pushes against the bridge 34 of the ribbon retainer subassembly forcing it forward. This design relies upon the spring characteristic of the plastic ribbon retainer and bridge combination to provide the normal force. The alignment projections 46/slot 50 feature of the ribbon holder and star ferrule reduce the tolerance stack to provide improved alignment over prior art designs.

What is claimed is:

1. An optical star assembly comprising:
a ribbon fiber optic mixing element having first and second ends, first and second bundles of fiber optic cables each having engagement ends, a housing for receiving the ribbon fiber optic mixing element and a portion of the fiber optic cables, and a biasing assembly connected with the housing which biases the first and second ends of the ribbon fiber optic mixing element towards the engagement ends of the first and second bundles of fiber optic cables respectively.

2. An optical star assembly as set forth in claim 1 wherein said housing includes an upper and lower half, and wherein the biasing assembly comprises first and second ribbon holders each connected to respective ends of the ribbon fiber optic mixing element and a bridge extending between the first and second ribbon holders, and wherein one of the housing halves includes a stop having a sloped surface positioned to engage the bridge when the upper and lower halves are connected together and so that the first and second ends of the ribbon fiber optic mixing element are biased towards the engagement ends of the first and second bundles of fiber optic cables respectively.

3. An optical star assembly as set forth in claim 2 wherein at least one of the bundles of fiber optic cables includes a first row of cables aligned in a first plane and overlying a second row of cables aligned in the second plane, and a star ferrule including a plurality Of channels formed therein each for receiving a fiber optic cable and constructed and arranged so that the fiber optic cable is guided by the channel and is transitioned in the X, Y and Z direction so that two fibers from the first row are transitioned into a linear array and are spaced apart a distance sufficient to receive a fiber from the second row therebetween and so that all the fibers in the first and second row are transitioned into one linear array engaging an end of the ribbon fiber optic mixing element.

4. An optical star assembly as set forth in claim 1 wherein the housing further comprises first and second halves and wherein the first half includes a first set of connection bays each for receiving a portion of one of the star ferrules, and guide rails extending upwardly from the floor of the first housing half in each of the first set of connection bays, and each of the star ferrules including an outwardly extending wing for mating with the guide rails in one of the connection bays of the first set.

5. An optical star assembly as set forth in claim 4 wherein said star ferrule includes an end face having alignment projections extending therefrom to be received in slots formed in an end face of the ribbon holder so that the end face of the ribbon holder and the end face of the star ferrule formed in alignment arm, and wherein the first half of the housing further comprises a second set of connection bays each for receiving an alignment arm formed by the end faces of the ribbon holder and star ferrule.

6. An optical star assembly as set forth in claim 1 wherein at least one of the bundles of fiber optic cables includes a first row of cables aligned in a first plane and overlying a second row of cables aligned in the second plane, and a star ferrule including a plurality of channels formed therein each for receiving a fiber optic cable and constructed and arranged so that the fiber optic cable is guided by the channel and is transitioned in the X, Y and Z direction so that two fibers from the first row are transitioned into a linear array and are spaced apart a distance sufficient to receive a fiber from the second row therebetween and so that all the fibers in the first and second row are transitioned into one linear array engaging an end of the ribbon fiber optic mixing element.

7. An optical star assembly as set forth in claim 6 wherein the housing further comprises first and second halves and wherein the first half includes a first set of connection bays each for receiving a portion of one of the star ferrules, and guide rails extending upwardly from the floor of the first housing half in each of the first set of connection bays, and each of the star ferrules including an outwardly extending wing for mating with the guide rails in one of the connection bays of the first set.

8. An optical star assembly as set forth in claim 7 wherein said star ferrule includes an end face having alignment projections extending therefrom to be received in slots formed in an end face of the ribbon holder so that the end face of the ribbon holder and the end face of the star ferrule formed in alignment arm, and wherein the first half of the housing further comprises a second set of connection bays each for receiving an alignment arm formed by the end faces of the ribbon holder and star ferrule.

* * * * *